US012559979B2

(12) United States Patent
Everett

(10) Patent No.: US 12,559,979 B2
(45) Date of Patent: Feb. 24, 2026

(54) MULTI-LOCK COMPRISING A KEYLESS LOCK FOR CLOSURES

(71) Applicant: KDB INTELLECTUAL PTY LTD, Queanbeyan East (AU)

(72) Inventor: Timothy Riva Everett, Queanbeyan East (AU)

(73) Assignee: KDB INTELLECTUAL PTY LTD, Queanbeyan East (AU)

( * ) Notice: Subject to any disclaimer, the term of this patent is extended or adjusted under 35 U.S.C. 154(b) by 104 days.

(21) Appl. No.: 18/241,526

(22) Filed: Sep. 1, 2023

(65) Prior Publication Data

US 2024/0076908 A1 Mar. 7, 2024

(30) Foreign Application Priority Data

Sep. 1, 2022 (AU) ................................ 2022902509

(51) Int. Cl.
*E05B 47/02* (2006.01)
*E05B 63/00* (2006.01)
(Continued)

(52) U.S. Cl.
CPC .......... *E05B 47/02* (2013.01); *E05B 63/0017* (2013.01); *E05B 47/0001* (2013.01); *E05B 63/0069* (2013.01); *E05B 63/08* (2013.01)

(58) Field of Classification Search
CPC ............. E05B 47/0001; E05B 47/0002; E05B 47/0012; E05B 47/02; E05B 47/023; E05B 63/0017; E05B 63/08; E05B 55/00; E05B 2047/0016; E05B 2047/0036; E05B 2047/0072; E05B 2047/0081; E05B 2047/0091; E05B 2047/0094
See application file for complete search history.

(56) References Cited

U.S. PATENT DOCUMENTS

| | | | |
|---|---|---|---|
| 616,144 | A | 12/1898 | Roth |
| 3,791,180 | A | 2/1974 | Doyle |

(Continued)

FOREIGN PATENT DOCUMENTS

| | | | |
|---|---|---|---|
| AU | 2006252130 | B1 | 6/2008 |
| AU | 2010202397 | A1 | 1/2011 |

(Continued)

OTHER PUBLICATIONS

Examination Report from Australian Application No. 2023222985 dated Feb. 22, 2024.

(Continued)

*Primary Examiner* — Christopher J Boswell
(74) *Attorney, Agent, or Firm* — Budzyn IP Law, LLC

(57) ABSTRACT

A multi-lock for a closure is described. The multi-lock includes a deadlock having a deadlock actuator operation of which moves a deadbolt between an unlocked retracted position and a locked extended position; a keyless lock having a keyless lock actuator wherein operation of the keyless lock moves a keyless locking component between a locked position and an unlocked position; and a linkage having a deadlock interaction segment in operative connection with the deadlock and a keyless lock interaction segment in operative connection with the keyless lock. A method of manufacturing the multi-lock for a closure and a method of installing the multi-lock are also described.

20 Claims, 10 Drawing Sheets

(51) Int. Cl.

| | |
|---|---|
| ***E05B 63/08*** | (2006.01) |
| *E05B 47/00* | (2006.01) |

(56) References Cited

U.S. PATENT DOCUMENTS

| | | | | |
|---|---|---|---|---|
| 3,875,772 | A | 4/1975 | Ebersman et al. | |
| 4,109,494 | A | 8/1978 | Allemann | |
| 4,390,197 | A | 6/1983 | Butts | |
| 5,077,992 | A | 1/1992 | Su | |
| 5,531,086 | A | 7/1996 | Bryant | |
| 5,657,653 | A | 8/1997 | Hensley | |
| 5,878,612 | A | 3/1999 | Mauer | |
| 6,079,755 | A * | 6/2000 | Chang | E05B 47/0002 292/144 |
| 6,112,563 | A * | 9/2000 | Ramos | G07C 9/00182 292/144 |
| 6,138,485 | A | 10/2000 | Fuss et al. | |
| 6,454,322 | B1 | 9/2002 | Su | |
| 7,014,226 | B1 * | 3/2006 | Huang | E05B 47/0002 292/144 |
| 9,951,546 | B1 | 4/2018 | Maniaci | |
| 10,337,207 | B1 * | 7/2019 | Tobias | E05B 47/0603 |
| 10,487,543 | B2 * | 11/2019 | Sanford | E05B 17/226 |
| 10,487,544 | B2 * | 11/2019 | Ainley | E05B 47/0012 |
| 11,674,333 | B2 * | 6/2023 | Milligan | E05B 63/0052 292/201 |
| 12,146,342 | B2 * | 11/2024 | Lovett | E05B 47/0001 |
| 2003/0071471 | A1 | 4/2003 | Lu | |
| 2004/0107747 | A1 | 6/2004 | Chang | |
| 2010/0231350 | A1 | 9/2010 | Scharer et al. | |

FOREIGN PATENT DOCUMENTS

| | | | |
|---|---|---|---|
| AU | 2018247281 | A1 | 5/2019 |
| CN | 101915022 | A | 12/2010 |
| DE | 3032086 | A1 | 3/1982 |
| EP | 0819813 | A2 | 1/1998 |
| EP | 2050902 | A1 | 4/2009 |
| EP | 2924201 | A1 | 9/2015 |
| GB | 2260568 | A | 4/1993 |
| RU | 2424409 | C1 | 7/2011 |
| SE | 431890 | B | 3/1984 |
| WO | 9601355 | A1 | 1/1996 |
| WO | 0188315 | A1 | 11/2001 |
| WO | 2004051035 | A1 | 6/2004 |
| WO | 2007000763 | A1 | 1/2007 |
| WO | 2020163896 | A1 | 8/2020 |
| WO | 2020206489 | A1 | 10/2020 |

OTHER PUBLICATIONS

European Examination Report and Search Report from European Patent Application No. EP23194951 dated Feb. 2, 2024.

* cited by examiner

MULTI-LOCK COMPRISING A KEYLESS LOCK FOR CLOSURES

FIELD OF THE INVENTION

The present invention relates to a multi-lock comprising a keyless lock for closures. More particularly, this invention relates to a combined deadlock and keyless lock, optionally with a safety override.

BACKGROUND TO THE INVENTION

The reference to any prior art in this specification is not, and should not be taken as, an acknowledgement or any form of suggestion that the prior art forms part of the common general knowledge.

The use of two or more locks on a door is common practice for various reasons including to restrict access to an area or the items within a room, building or safe.

Under normal circumstances, unlocking one or more locks of a door rarely presents a problem. However, in the event of a fire, necessity to exit, security risk or other hazardous event, it is important that all the locks on a door be able to be quickly opened. Any delays can increase the risk of escaping the hazard, or in the case of emergency responders, increase the time taken to deal with the hazard.

Clearly, in such situations, it would be advantageous if the bolts of the locks on a door could be withdrawn from their locking position.

In the past there have been a number of arrangements for the simultaneous unlocking of two locks by the rotation of a single handle. These include the mechanism described in U.S. Pat. No. 616,144, to open two spaced apart locks on a door constructed of wood that will warp out of line after being hung. Other mechanisms are described in U.S. Pat. No. 5,077,992, Australian Patent Application No. 2006252130, U.S. Pat. Nos. 4,109,494, 6,454,322, 3,875,772, US Publication No. US2004/0107747 A1, U.S. Pat. Nos. 3,791,180 and 5,657,653 and Australian Patent No. 2010202397.

Each of these mechanisms includes a respective rotatable member operatively associated with each lock, with an interconnection between each rotatable member, such that when both locks are locked and one rotatable member is rotated, so is the other rotatable member, and each lock is unlocked. The interconnection may be a rod or a pair of rods (for example, the mechanisms of U.S. Pat. No. 616,144, 5,077,992 and 6,454,322), a pulley and cable arrangement (see U.S. Pat. No. 3,875,772), or a more complex arrangement.

European Patent Publication No. 2924201, the publication of European Patent Application No. 15159962.8, to ASSA ABLOY Sicherheitstechnik GmbH, discloses self-locking lock for a closure for a panic room that has an automatic extension of a bolt 3 controlled by an auxiliary latch 5 and latch 4 all on the one door lock. An electric motor 13, triggered by a reading unit reading an identification chip, can be used to couple the bolt 3.

U.S. Pat. No. 6,138,485, to eff-eff Fritz Fuss GmbH & Co. Kommanditgesellschaft auf Aktien, is also directed to a closure for a panic room. Both a bolt 4 and a lock catch 5, on the one door lock, may be retracted by operation of an inner or panic nut 26, a panic rack 40, a cam 28, transport lever 29, side plate 12 and catch lever 30. The outer latch may also be activated under conditions of authorised access such as with an access control system.

WO2007/000763, the publication of International Patent Application No. PCT/IL2006/000746 to GOLTEK MIGON 2005 LTD., relates to a mortise lock with a panic selector. The mortise lock has a latch 74 and a plurality of face bolts 76 on the one mortise lock. Also disclosed are top and bottom auxiliary locks 84T, 84B connected with extension rods 82T, 82B. All of the latch 74, face bolts 76 and auxiliary locks 84T and 84B are opened or retracted by a mechanism within the mortise lock. A panic selector 138 may be used to permit a person at an inside of the door to unlock the latch 74, face bolts 76 and top and bottom bolts with a single depression of the inside handle 46.

German Patent Application No DE3032086, to Scovill Sicherheitseinrichtungen GmbH, discloses a panic lock that has an electromagnet to activate the panic function. Also described is a panic tube frame lock that has two lock nuts 33, 34 in the same housing one of which is operated by the panic lever 26.

There is an ongoing need for new, low cost, reliable alternatives to the mechanisms of the prior art, many of which are generally extremely complicated.

Incorporation by Reference—Multi-Lock Mechanism

One example of a multi-lock mechanism, with a bolt withdrawal mechanism for releasing two locks, is described in the present inventor's, commonly owned Australian Patent Application No. 2018247281 entitled "MULTI-LOCK AND METHOD FOR USE." The entire contents of Australian Patent Application No. 2018247281 are hereby incorporated by reference into the present application.

Incorporation by Reference—Sliding Door Lock

One example of a sliding door lock, is described in the present inventor's, commonly owned International patent Application No. PCT/AU2020/000015, published as WO/2020/163896, entitled "LOCK FOR SLIDING CLOSURE." The entire contents of WO/2020/163896 are hereby incorporated by reference into the present application.

Incorporation by Reference—Lock Release Mechanism

One example of a lock release, is described in the present inventor's, commonly owned International patent Application No. PCT/AU2020/000031, published as WO/2020/206489, entitled "LOCK RELEASE MECHANISM." The entire contents of WO/2020/206489 are hereby incorporated by reference into the present application.

SUMMARY OF THE INVENTION

Generally, embodiments of the invention relate to a multi-lock for a closure, the multi-lock comprising a keyless lock. Particular embodiments relate to a multi-lock comprising a deadlock and a keyless lock. Other particular embodiments relate to a combined deadlock and keyless lock with a safety override.

Advantageously, the deadlock may be applied to doors such as, swing doors and/or sliding doors.

In a first form, although it need not be the only or indeed the broadest form, the invention resides in a multi-lock for a closure comprising:

- a deadlock comprising a deadlock actuator operation of which moves a deadbolt between an unlocked retracted position and a locked extended position;
- a keyless lock comprising a keyless lock actuator wherein operation of the keyless lock moves a keyless locking component between a locked position and an unlocked position; and a linkage comprising a deadlock interaction segment in operative connection with the deadlock and a keyless lock interaction segment in operative connection with the keyless lock.

In a second form, although it need not be the only or indeed the broadest form, the invention resides in a method of manufacturing a multi-lock for a closure comprising:

providing a deadlock comprising a deadlock actuator operation of which moves a deadbolt between an unlocked retracted position and a locked extended position;

providing a keyless lock comprising a keyless lock actuator wherein operation of the keyless lock moves a keyless locking component between a locked position and an unlocked position; and providing a linkage comprising a deadlock interaction segment in operative connection with the deadlock and a keyless lock interaction segment in operative connection with the keyless lock.

In a third form, although it need not be the only or indeed the broadest form, the invention resides in a method of installing a multi-lock for a closure comprising:

installing a deadlock comprising a deadlock actuator operation of which moves a deadbolt between an unlocked retracted position and a locked extended position;

installing a keyless lock comprising a keyless lock actuator wherein operation of the keyless lock moves a keyless locking component between a locked position and an unlocked position; and installing a linkage comprising a deadlock interaction segment in operative connection with the deadlock and a keyless lock interaction segment in operative connection with the keyless lock.

The method according to the third aspect may be a new installation or a retro-installation into an existing closure.

In a further aspect of the invention, there is provided a closure comprising a multi-lock for a closure according to the first aspect of the invention. The closure may comprise a sliding door or a swing door. The closure may be for a vault.

According to any one of the above aspects, the keyless locking component may be in an extended position in the locked position and a retracted position in the unlocked position. The keyless locking component may be operatively connected to the linkage. The operative connection is such that movement of the keyless locking component directly results in corresponding movement of the linkage. The operative connection may be a join, an integral formation or a magnetic connection. In a particular embodiment, the keyless locking component is operatively connected to the keyless lock interaction segment. The keyless locking component may be in the form of a locking bolt.

According to any one of the above aspects, the linkage has an extended and locked orientation in which the keyless lock is locked and a retracted and unlocked orientation in which the keyless lock is unlocked.

In one embodiment of any one of the above aspects, the deadlock comprises a deadlock flange disposed to move with operation of a deadlock actuator. The deadlock actuator may concomitantly move the deadlock flange. The deadlock flange may have a locked orientation and an unlocked orientation. The deadlock flange locked orientation and the deadlock flange unlocked orientation may be different. The deadlock flange may be dimensioned so that its movement from the locked orientation to the unlocked orientation is prevented when the linkage is in the extended and locked orientation. The deadlock flange may be dimensioned so that its movement is not restricted when the linkage is in the retracted and unlocked orientation. The deadlock flange may be dimensioned to abut the linkage when the linkage is in the extended and locked orientation. The deadlock may be constructed so that movement of the deadlock actuator and thereby the deadbolt is not possible without the concomitant movement of the deadlock flange. The deadlock may be disposed so that movement of the deadlock actuator and thereby the deadbolt is not possible unless the linkage is in the retracted and unlocked orientation.

According to any one of the above aspects, the deadlock actuator may comprise a lever, handle or knob. The lever, handle or knob may be rotated or be pushed. The deadlock may comprise a deadlock actuator on both sides of the closure.

According to any one of the above aspects, the deadlock may comprise a drive mechanism to drive the deadbolt.

According to any one of the above aspects, the linkage may comprise an intermediate component, movement of the intermediate component may allow relative movement of the deadlock interaction segment and the keyless lock interaction segment. The intermediate component may be moved from a blocking position to a free position. The intermediate component may be held in the blocking position which prevents the relative movement by a biasing mechanism. The biasing mechanism may comprise a spring.

In one embodiment of any one of the above aspects, movement of the intermediate component to the free position may allow independent movement of both the deadlock interaction segment and the keyless lock interaction segment.

According to any one of the above aspects, the relative movement and/or movement between the two orientations of the linkage may be within a channel. The channel may be comprised in a multi-lock chassis. The relative movement may be lateral movement within the channel. The bias of the intermediate component may be in a different direction, optionally orthogonal, to the lateral movement.

According to any one of the above aspects, the intermediate component may be positioned between the keyless lock interaction segment and the deadlock interaction segment. The positioned between may mean between respective distal ends of the keyless lock interaction segment and the deadlock interaction segment. The term "positioned between" may mean positioned between distal ends of the keyless lock interaction segment and the deadlock interaction segment and within an extent of one of the keyless lock interaction segment or the deadlock interaction segment. The intermediate component may comprise a deadlock abutting surface and a keyless lock abutting surface. The deadlock abutting surface and the keyless lock abutting surface may be on opposing sides of the intermediate component. The biasing mechanism may act on a biased surface of the intermediate component. The biased surface may be oriented perpendicularly to the opposed deadlock abutting surface and the keyless lock abutting surface.

According to any one of the above aspects, the intermediate component may comprise a protrusion. The protrusion may extend from an intermediate component base. The intermediate component base may be wider than the protrusion. When the intermediate component is in the free position, the deadlock interaction segment may be free to move relative to the keyless lock interaction segment to occupy space occupied by the protrusion when the intermediate component is in the biased position.

In another particular embodiment of any one of the above aspects, the intermediate component may be received in a gap of one or both of the deadlock interaction segment or the keyless lock interaction segment. In one particular embodiment, the deadlock interaction segment may comprise the gap. In another particular embodiment, the keyless lock interaction segment may comprise the gap.

The intermediate component may comprise a transient contact surface. The transient contact surface may make contact with another component of the linkage in a blocking or biased position and not in a free or unbiased position. The another component may comprise the deadlock interaction segment, optionally a deadlock interaction segment engagement flange. The transient contact surface may be in a different plane to the opposing surfaces of the intermediate component. The different plane may be an orthogonal plane. The transient contact surface may be parallel to from the opposing surfaces. The intermediate component may be L-shaped.

The intermediate component may comprise a channel surface adjacent surface. The channel surface adjacent surface may move away from the channel surface when the intermediate component is moved from the blocking position to the free position. The protrusion may comprise the channel surface adjacent surface.

According to any one of the above aspects, when in the locked orientation the deadlock flange does not extend into the channel and when in the unlocked orientation the deadlock flange does extend into the channel.

According to any one of the above aspects, when the intermediate component is in a free or unbiased position, the relative movement may allow the deadlock interaction segment to move relative to the keyless lock interaction segment.

According to any one of the above aspects, the deadlock interaction segment and the keyless lock interaction segment comprise two separate segments.

In one embodiment of any one of the above aspects, the two separate segments of the linkage may each comprise an engagement flange. The engagement flanges may be engaged so that movement of one segment concomitantly moves the other segment. The engagement flanges may be engaged so that movement of one segment, in one direction, concomitantly moves the other segment in the same direction and concomitant movement in the other direction may be dependent on the position of the intermediate component. The deadlock interaction engagement flange and the keyless lock interaction segment engagement flange may be dimensioned so that, independent of the intermediate component position, the two segments move concomitantly in only one direction. The deadlock interaction engagement flange and the keyless lock interaction segment engagement flange may be dimensioned so that, when the intermediate component is in either the free position or the blocking position, movement of the deadlock interaction segment towards the deadlock concomitantly moves the keyless lock interaction segment in the same direction.

According to any one of the above aspects, the two separate segments of the linkage may be dimensioned so that when the intermediate component is in the free position, each segment may move independently of the other. When the intermediate component is in the free position and the two separate segments are abutting, depending on the direction of movement, due to the abutment, movement of one segment may cause movement of the other segment. Again, when the intermediate component is in the free position and the two separate segments are abutting, independent movement of the segments may be possible in one direction but not the other.

According to any one of the above aspects, the deadlock interaction segment may comprise an L-shape. The engagement flange may extend from one end of the L-shape. The engagement flange may extend from an end of the foot of the L-shape.

According to any one of the above aspects, the keyless lock interaction segment may comprise an S-shape. The engagement flange may be comprised on one end of the S-shape. The intermediate component may be housed between two parallel arms of the S-shape.

According to any one of the above aspects, the linkage may be an integral or one-piece component.

According to any one of the above aspects, the deadlock interaction segment is adjacent to the deadlock and the keyless lock interaction segment is adjacent to the keyless lock.

According to any one of the above aspects, the deadlock interaction segment may be biased to the extended and locked orientation by a segment biasing mechanism. The segment biasing mechanism may comprise a spring. The keyless locking component may overcome the segment biasing mechanism to move the linkage when the keyless lock is locked. When the keyless lock is unlocked, the segment biasing mechanism may be operational such that the bias is applied.

According to any one of the above aspects, the multi-lock comprises a safety override. The safety override may allow manual movement of the linkage and thereby manual movement of the deadlock actuator to unlock the deadlock and open the closure. The safety override may comprise one or more safety override actuators. In one particular embodiment, when the deadlock interaction segment is biased, the safety override comprises one actuator. In another particular embodiment, the safety override comprises two actuators. The safety override may comprise an intermediate component safety actuator. When two actuators are comprise a linkage safety actuator may also be comprised. The linkage safety actuator may be comprised on the deadlock interaction segment. Each of the one or more safety actuators may be dimensioned to be gripped by hand, optionally in the form of a handle, pin or rod. Each of the one or more safety actuators may be removable optionally from a housing. A deadlock housing may be comprised on the deadlock interaction segment and an intermediate housing may be comprised on the intermediate component. Operation of the intermediate component safety actuator may move the intermediate component against the biasing mechanism. Operation of the linkage safety actuator may move the deadbolt from the locked extended position to the unlocked retracted position.

The safety override may be located on and operable only on a safe side of the closure. Advantageously, the safety override allows opening of the closure independent of the keyless lock and with the deadlock locked.

According to any one of the above aspects, the safety override may be behind a break glass assembly. The break glass assembly may be positioned over the one or more safety override actuators. The break glass assembly may comprise a break glass window, optionally comprised of frangible glass, a polymer or other material, preferably transparent. The break glass window may be disposed distal to the deadbolt actuator. The break glass window may comprise one or more fenestration for fitting underneath a top-plate. The break glass assembly may comprise a packing cassette with a side wall. The sidewall may have a height to create space inside the break glass assembly.

In one embodiment of any one of the above aspects, the break glass assembly may be disposed on only one side of the closure. The break glass assembly may be disposed on a safe side of a closure.

The keyless lock actuator may comprise a dial, a keypad or biometric authenticator or authentication input. The keyless lock may be a permutation lock. Operation of the actuator may unlock the keyless lock. The keyless lock may comprise a drive mechanism to drive the keyless locking component.

According to any one of the above aspects, the keyless lock actuator may require unlocking for operation. The unlocking may require entry of a correct combination or biometric authentication or authentication.

According to any one of the above aspects the keyless lock actuator may be disposed on only one side of the closure. The keyless lock actuator may be disposed on an attack side of the closure.

The deadlock according to any one of the above aspects may comprise a deadbolt. The deadbolt may be in an extended position in the locked position and a retracted position in the unlocked position. The retracted position may be within a multi-lock chassis. The extended position may extend out of a multi-lock chassis to effect the locking of the closure.

The multi-lock according to any one of the above aspects may comprise a switch or microswitch. The switch or microswitch may make contact with the linkage when the linkage is in the extended and locked orientation but no contact with the linkage in the retracted and unlocked orientation. This extended and locked orientation of the linkage requires the keyless lock to be locked and the keyless locking component to be extended. The switch or microswitch contact status may be reported to a monitor. A change in status may trigger an alarm. The alarm may comprise sending of one or more electronic communication.

The multi-lock according to any one of the above aspects may comprise a distal lock. The distal lock may be a deadlock or a mortice lock. The distal lock may be connected to the deadlock with a linkage mechanism. The linkage mechanism may be distinct from the linkage 110.

The multi-lock according to any one of the above aspects may comprise a multi-lock chassis adapted to receive the dead lock and optionally the combination lock. The chassis may further comprise the distal lock. The multi-lock chassis may comprise one or more void and/or one or more insertion flange for receiving the keyless lock body. The multi-lock chassis may comprise tamper-resistant or tamper-proof fasteners.

According to any one of the above aspects, any one of the drive mechanisms may comprise an automated drive mechanism such as, various electrically operated drive mechanisms. For example, the drive mechanism may comprise a motor to drive movement. However, other drive mechanisms may be used, such as electronic or electromechanical mechanisms, including a solenoid, a sprung pin activated by a solenoid, or other motor driven cam arrangements. The electronic or electromechanical mechanisms may draw power from a power supply. The drive mechanism may be internally located.

In embodiments comprising a solenoid, the solenoid may actuate between different orientations or positions.

According to any one of the above aspects, any one of the drive mechanisms may be controlled electronically by an electronic control. The electronic control may comprise one or more of a circuit board or computer such as, a programmable logic controller. The electronic control may be disposed inside or external to the chassis. The drive mechanism may be connected or connectable to a main door or building access controller.

The drive mechanism may be actuated when a particular event is detected. For example, the drive mechanism may be actuated when a person activates an emergency feature of a building—such as a "break glass" switch.

The drive mechanism may operate in a vertical or a horizontal direction.

Further aspects of the present invention will also be described in the detailed description of the invention below.

A detailed description of one or more embodiments of the invention is provided below, along with accompanying figures that illustrate by way of example the principles of the invention. While the invention is described in connection with such embodiments, it should be understood that the invention is not limited to any one or combination of embodiments. On the contrary, the scope of the invention is limited only by the appended claims and the invention encompasses numerous alternatives, modifications and equivalents.

For the purpose of example, numerous specific details are set forth in the following description in order to provide a thorough understanding of the present invention. The present invention may be practiced according to the claims without some or all of these specific details. For the purposes of clarity, technical material that is known in the technical fields related to the invention has not been described in detail so that the present invention is not unnecessarily obscured.

BRIEF DESCRIPTION OF THE DRAWINGS

In order that the invention may be readily understood and put into practical effect, reference will now be made to embodiments of the present invention with reference to the accompanying drawings, wherein like reference numbers refer to identical elements. The drawings are provided by way of example only, wherein.

Figure 1A:
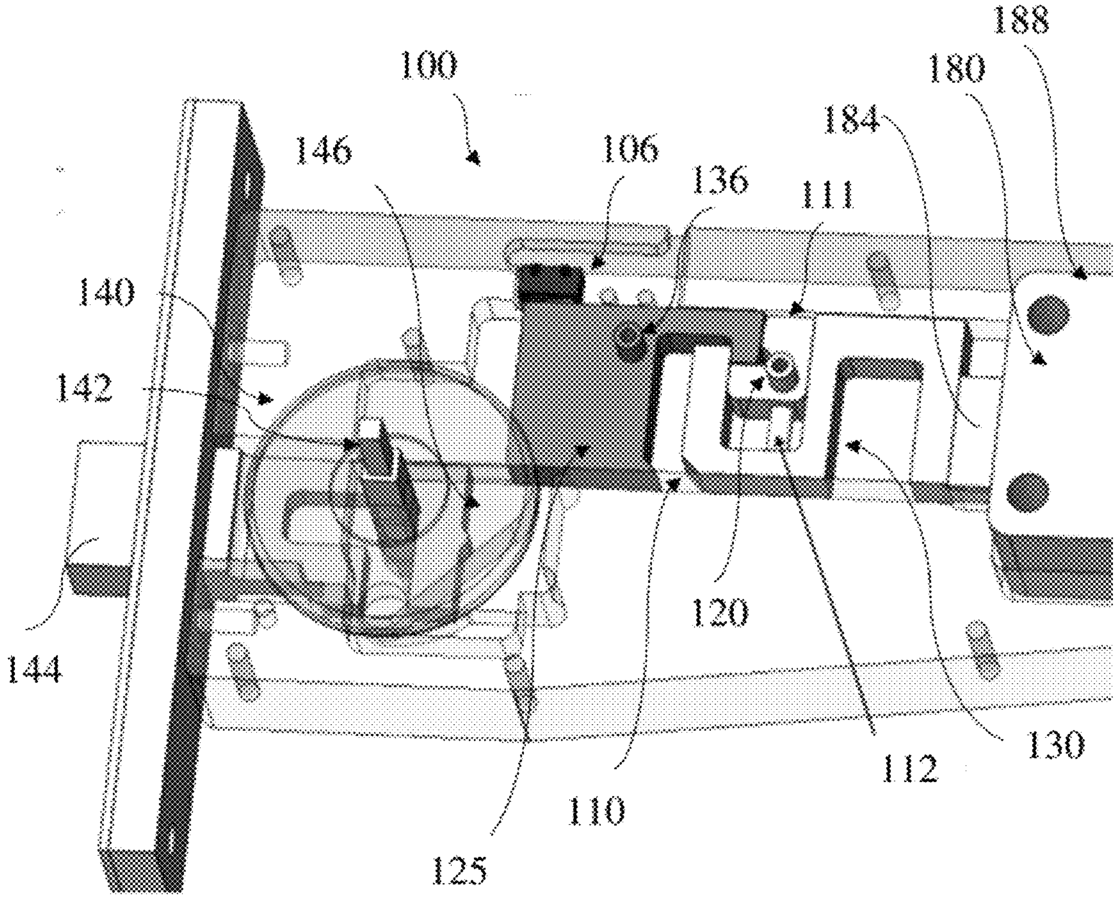
FIG. 1A shows a top perspective, partial phantom view.
Figure 1B:
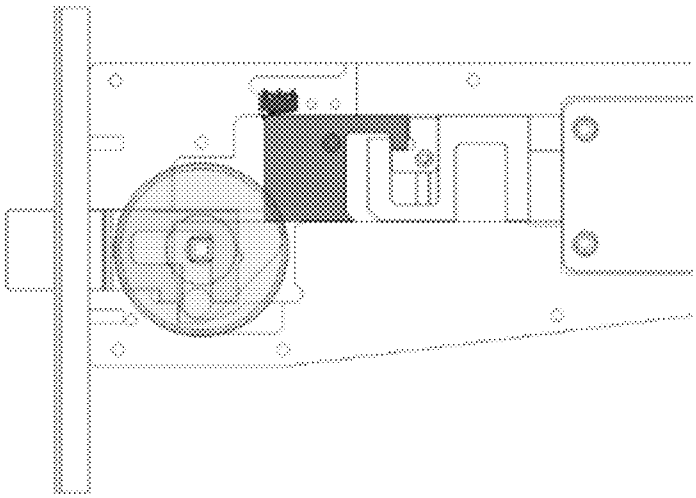
FIG. 1B shows a top plan, partial phantom view of a multi-lock, with the cover removed and the keyless lock locked and dead bolt locked and extended according to one embodiment of the present invention.
Figure 1C:
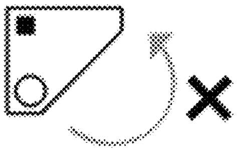
FIG. 1C is schematic diagram illustrating that in the orientation shown in FIG. 1A, the deadbolt lock cannot be moved.

Skilled addressees will appreciate that elements in the drawings are illustrated for simplicity and clarity and have not necessarily been drawn to scale. For example, the relative dimensions of some elements in the drawings may be distorted to help improve understanding of embodiments of the present invention.

TABLE OF PARTS

| | |
|---|---|
| 100 | multilock |
| 102 | chassis |
| 104 | channel |
| 106 | microswitch |
| 110 | linkage |
| 111 | intermediate component |
| 112 | biasing mechanism (spring) |
| 113 | (opposing) deadlock abutting surface |
| 114 | (opposing) keyless lock abutting surface |
| 115 | biased surface |
| 116 | channel surface adjacent surface |
| 118 | protrusion |
| 119 | transitory contact surface |
| 120 | intermediate component safety actuator |
| 121 | intermediate component base |
| 125 | deadlock interaction segment |
| 127 | deadlock interaction segment engagement flange |
| 128 | segment biasing mechanism |
| 130 | keyless lock interaction segment |
| 131 | keyless lock interaction segment engagement flange |
| 132 | gap |
| 135 | safety override |
| 136 | linkage safety actuator |
| 137 | housing |
| 140 | Deadlock |
| 142 | deadlock actuator (knob) |
| 144 | Deadbolt |
| 146 | deadlock flange |
| 160 | break glass assembly |
| 161 | break glass window |
| 162 | fenestrations |
| 164 | top plate |
| 180 | keyloss lock |
| 182 | Actuator |
| 184 | keyless locking component |
| 186 | Motor |
| 188 | keyless lock body |
| 190 | distal lock |

DETAILED DESCRIPTION OF THE INVENTION

For purposes of description herein, the terms "upper," "lower," "right," "left," "rear," "front," "vertical," "horizontal," "interior," "exterior," and derivatives thereof shall relate to the invention as oriented in FIG. 1A. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature or component extending in or along a given direction or the like does not mean that the feature or component follows a straight line or axis in such a direction or that it only extends in such direction or on such a plane without other directional components or deviations, unless otherwise specified.

Closures, such as doors, normally require at least one lock so that the closure can be secured in the closed position. Many doors have two locks—a latch lock (such as a mortise lock) and a deadbolt lock for security—which are typically located adjacent the closing edge of the door. Fire and/or security doors are usually configured so that both locks can be simply and quickly, manually operated by a handle, simultaneously unlocking both locks. As the handle is moved, a latch hook or bolt disengages with a strike that is attached to the frame, thus releasing the door. A strike is a plate attached to a door frame with one or more holes for removably receiving a latch or bolt from a lock.

For convenience, the invention will be described in relation to a swing door. However, the invention has broader application to securing a range of closures, including sliding doors and other closures such as gates.

The invention is directed to a multi-lock for a closure, the multi-lock comprising a keyless lock. Particular embodiments relate to a multi-lock comprising a deadlock and a keyless lock. Other particular embodiments relate to a combined deadlock and keyless lock with a safety override.

A Table of Parts is provided in Table 1 above.

FIG. 1A shows a multi-lock 100 for a closure 200 (not shown) according to one embodiment of the invention. Multi-lock 100 comprises a deadlock 140 comprising a deadlock actuator 142 operation of which moves a deadbolt 144 between an unlocked retracted position and a locked extended position.

FIG. 1A also shows a keyless lock 180 comprising a keyless lock actuator 182 (not shown) wherein operation of the keyless lock 180 moves a keyless locking component 184 between a locked position and an unlocked position.

Linkage 110, is also shown in FIG. 1A, comprising a deadlock interaction segment 125 in operative connection with deadlock 140 and a keyless lock interaction segment 130 in operative connection with the keyless lock 180.

Figure 2A:
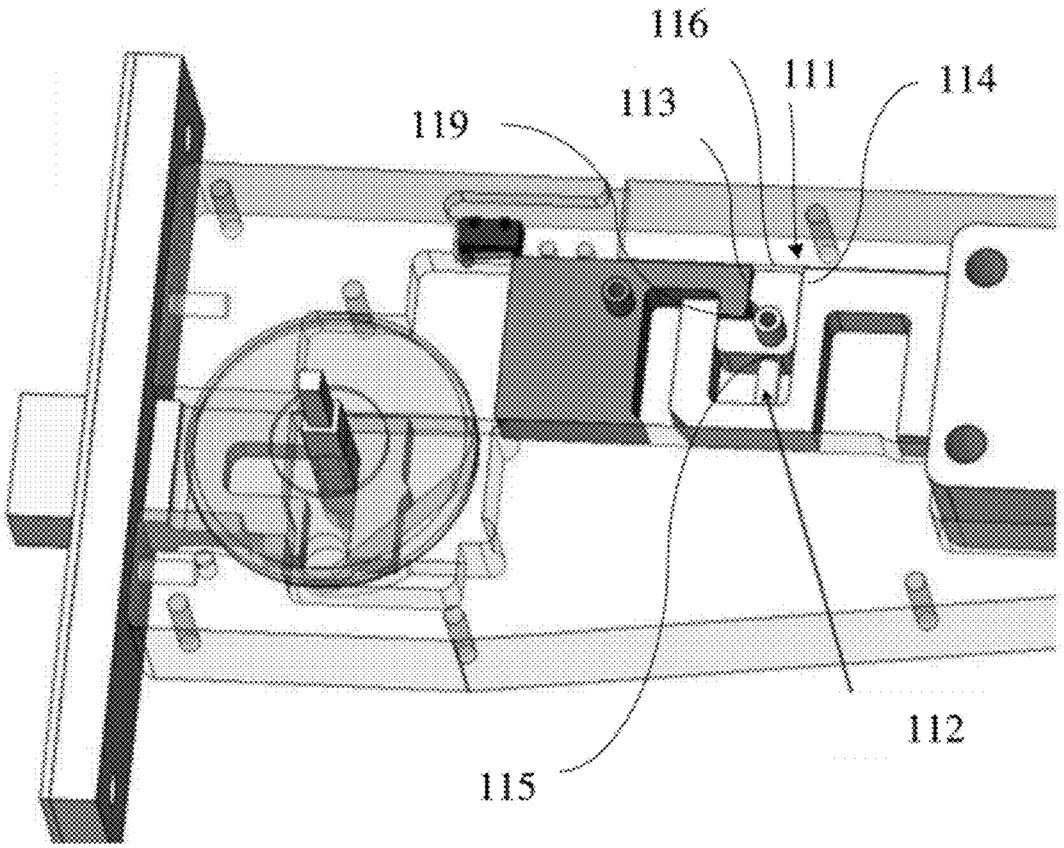
FIG. 2A shows a top perspective, partial phantom view.
Figure 2B:
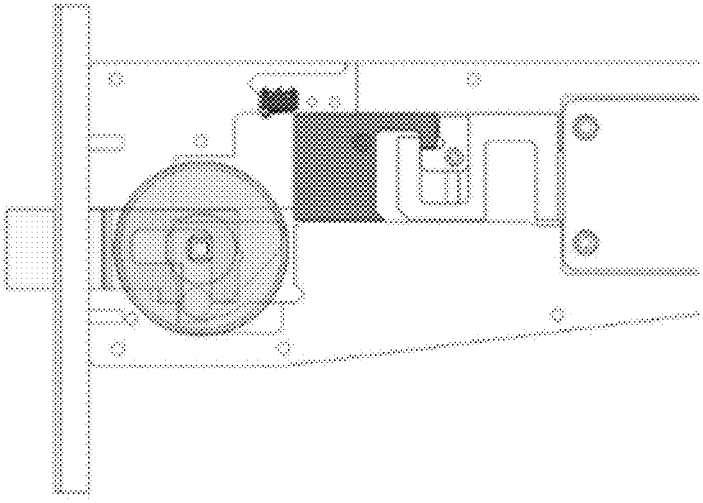
FIG. 2B shows a top plan, partial phantom view of a multi-lock, with the cover removed and the keyless lock unlocked and dead bolt is unlocked and extended according to one embodiment of the present invention.
Figure 2C:
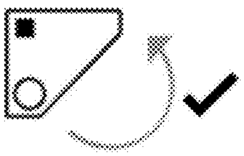
FIG. 2C is schematic diagram illustrating that in the orientation shown in FIG. 1A, the deadbolt lock can be moved.
Figure 3A:
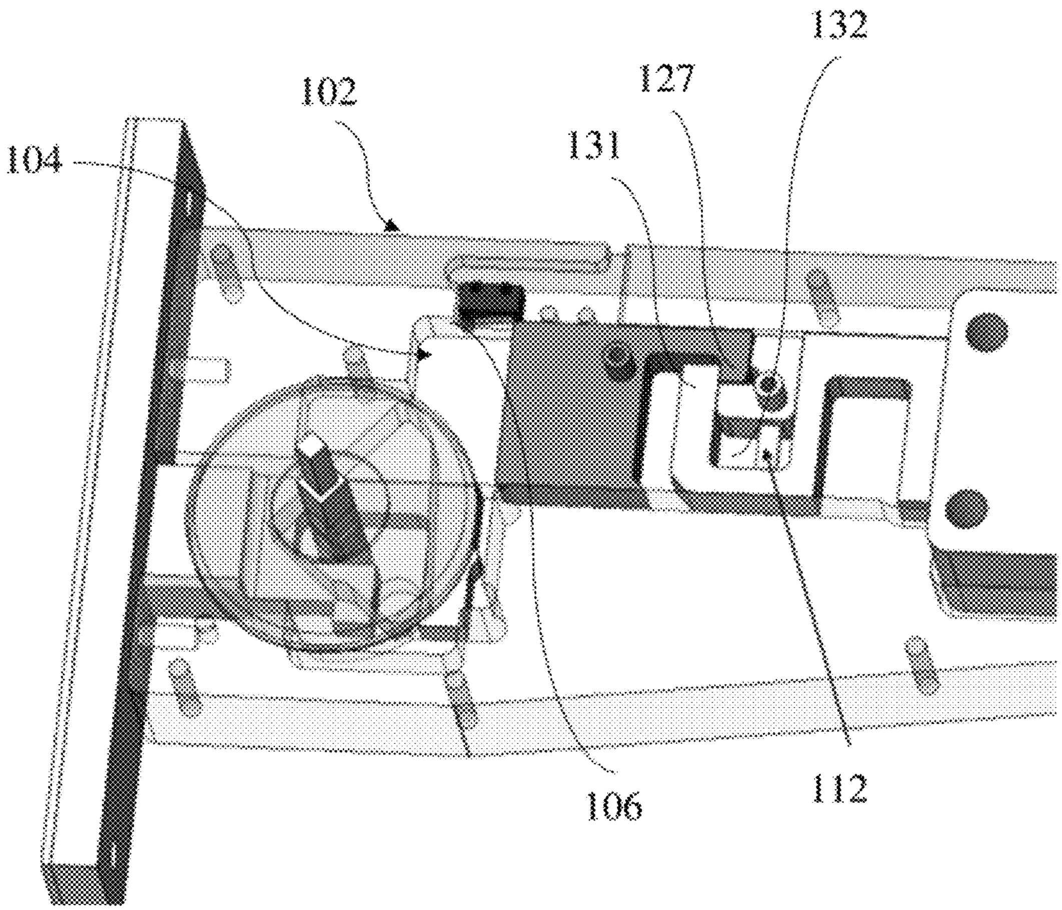
FIG. 3A shows a top perspective, partial phantom view.
Figure 3B:
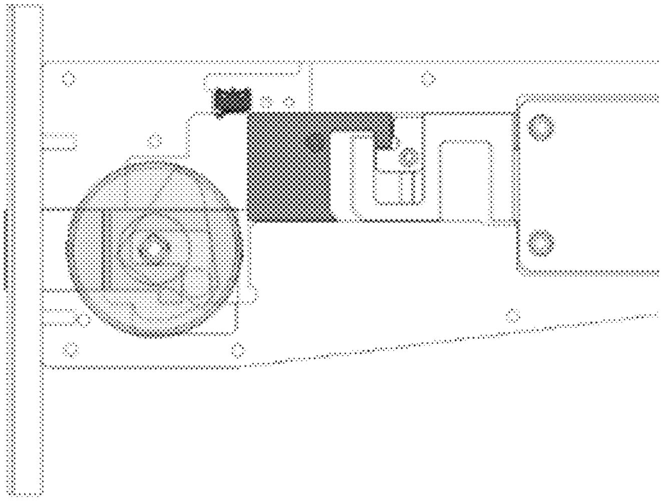
FIG. 3B shows a top plan, partial phantom view of a multi-lock, with the cover removed and the keyless lock unlocked and dead bolt unlocked and extended, but free to move to the retracted orientation, according to one embodiment of the present invention.
Figure 3C:
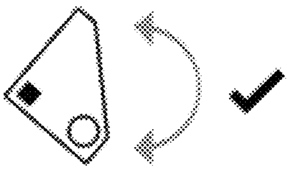
FIG. 3C is schematic diagram illustrating that in the orientation shown in FIG. 1A, the deadbolt lock can be moved.
Figure 4A:
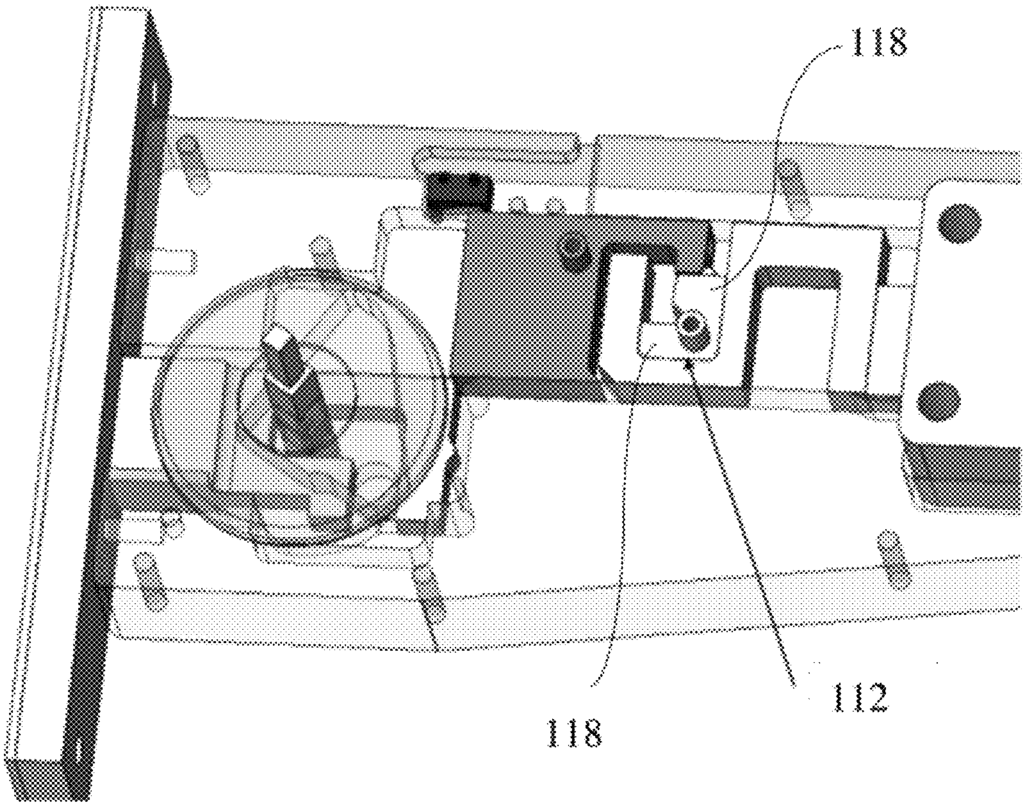
FIG. 4A shows a top perspective, partial phantom view.
Figure 4B:
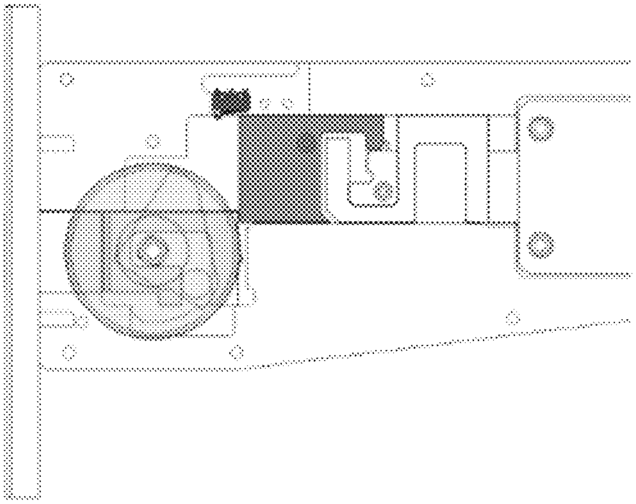
FIG. 4B shows a top plan, partial phantom view of a multi-lock, with the cover removed and the keyless lock unlocked and dead bolt unlocked and retracted according to one embodiment of the present invention.
Figure 5:
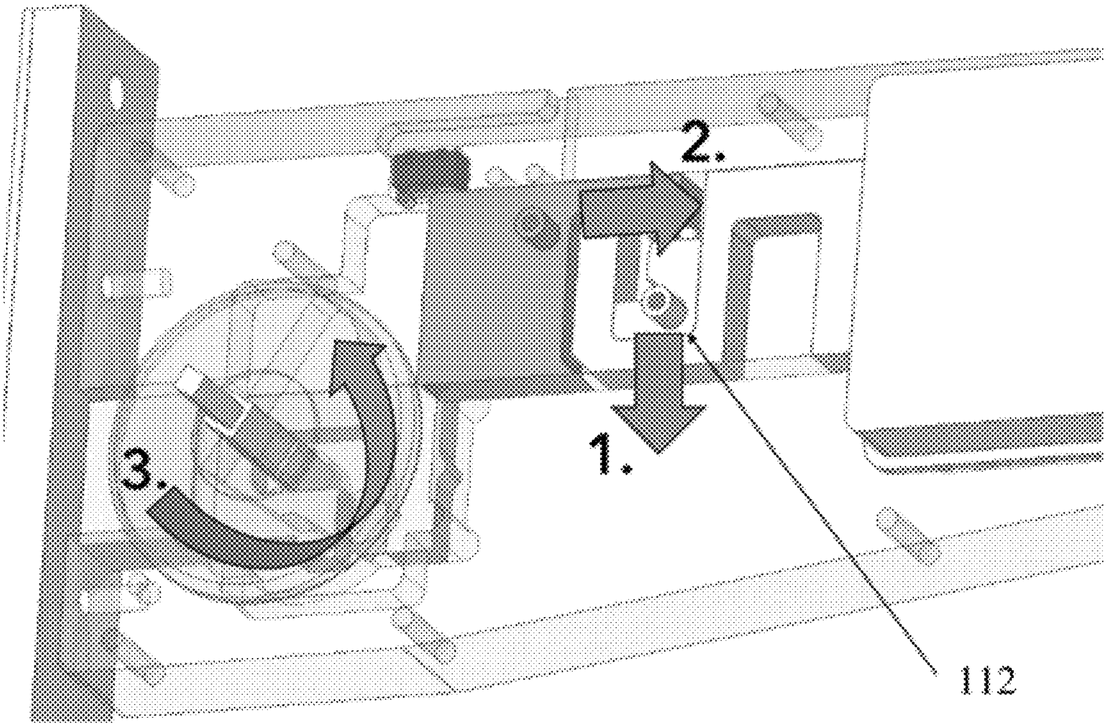
FIG. 5 is a schematic, perspective, partial phantom showing the actions taken to unlock and open the closure when the override is used. (1) The biased intermediate component is moved to allow (2) the deadlock interaction segment to be moved relative to the keyless interaction segment which frees (3) the deadlock actuator to move to withdraw the deadbolt.
Figure 6:
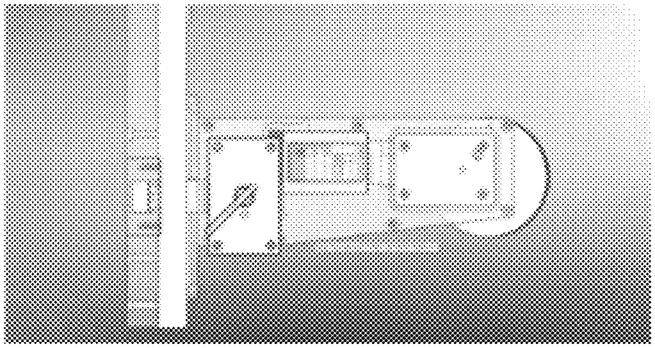
FIG. 6 is a schematic, perspective, partial phantom view of a multi-lock for a closure according to another embodiment of the invention.

As shown by comparing FIGS. 1A, 2A and 3A, the keyless locking component 184 is in an extended position in the locked position and a retracted position in the unlocked position.

Also shown in FIGS. 1A, 2A and 3A, is that keyless locking component 184 is operatively connected to linkage 110, such that movement of the keyless locking component 184, shown as a locking bolt, directly results in corresponding movement of linkage 110. The operative connection may be a join, an integral formation or a magnetic connection. In the illustrated embodiment, keyless locking component 184 is operatively connected to keyless lock interaction segment 130.

FIGS. 1A, 2A and 3A illustrate linkage 110 to have an extended and locked orientation in which the keyless lock 180 is locked and a retracted and unlocked orientation in which the keyless lock 180 is unlocked.

FIGS. 1A, 2A and 3A also show, in phantom, deadlock 140 to comprise a deadlock flange 146 disposed to move with operation of a deadlock actuator 142, that is movement of deadlock actuator 142 concomitantly moves deadlock flange 146. Deadlock flange 146 is illustrated to have a locked orientation and an unlocked orientation, which are different. Deadlock flange 146 is dimensioned so that its movement from the locked orientation to the unlocked orientation is prevented when linkage 110 is in the extended and locked orientation and so that its movement is not restricted when linkage 110 is in the retracted and unlocked orientation.

Although not illustrated, deadlock flange 146 may be dimensioned to abut the linkage 110 when the linkage 110 is in the extended and locked orientation.

Deadlock 140 is constructed so that movement of the deadlock actuator 142 and thereby deadbolt 144 is not possible without the concomitant movement of deadlock flange 146. Correspondingly, deadlock 140 is disposed so that movement of deadlock actuator 142 and thereby deadbolt 144 is not possible unless linkage 110 is in the retracted and unlocked orientation.

As illustrated, in the locked orientation the deadlock flange 146 does not extend into the channel and when in the unlocked orientation the deadlock flange 146 does extend into the channel.

From the teaching herein, the skilled person readily understands that deadlock actuator 142 may be in any suitable form such as, a lever, handle or knob, which may be rotated or be pushed. A deadlock actuator 142 may be comprised on both sides of the closure 200 (not shown).

Again, as shown in FIGS. 1A, 2A and 3A, linkage 110 comprises an intermediate component 111, movement of which allows relative movement of deadlock interaction segment 125 and keyless lock interaction segment 130. The movement of intermediate component 111 is from a blocking position, in which it is held by a biasing mechanism 112, illustrated to be a spring. In the blocking position, the relative movement is prevented.

As shown in FIGS. 1A, 2A and 3A, movement of intermediate component 111 to the free position allows independent movement of both the deadlock interaction segment 125 and the keyless lock interaction segment 130.

Also illustrated in FIGS. 1A, 2A and 3A is that the relative movement and/or movement between the two orientations of linkage 110 is within a channel 104 comprised in a multilock chassis 102. While the relative movement is illustrated to be lateral movement within the channel 104, other movement types are possible. The bias of the intermediate component 111 is shown to be in a different direction to the lateral movement. While this is illustrated to be orthogonal, to the lateral movement, other orientations are possible.

As shown in FIGS. 1A, 2A and 3A, the intermediate component 111 is positioned between keyless lock interaction segment 130 and deadlock interaction segment 125. From the teaching herein, the skilled person readily understands that "positioned between" includes a positioning between respective distal ends of the keyless lock interaction segment 130 and the deadlock interaction segment 125. That is, as illustrated, the intermediate component 111 is positioned between the distal ends of the keyless lock interaction segment 130 and the deadlock interaction segment 125 and within an extent of the keyless lock interaction segment 130. The intermediate component 111 comprises opposing deadlock abutting surface 113 and a keyless lock abutting surface 114. The biasing mechanism 112 acts on a biased surface 115 of intermediate component 111, with the biased surface 115 oriented perpendicularly to opposing surfaces 113, 114.

FIGS. 1A, 2A and 3A also show intermediate component 111 to comprise a protrusion 118 which extends from an intermediate component base 121. The intermediate component base 121 is wider than protrusion 118. When the intermediate component is in the free position, the deadlock interaction segment 125 may be free to move relative to the keyless lock interaction segment to occupy space occupied by the protrusion 118 when the intermediate component is in the biased position.

As illustrated, intermediate component 111 is received in a gap 132 comprised in the keyless lock interaction segment 130. From the teaching herein, the skilled person readily understands that in other embodiments, the deadlock interaction segment 125 may comprise a gap in which the intermediate component 11 is received.

Intermediate component 111 also comprises a transient contact surface 119 which is shown to make contact with the deadlock interaction segment 125, specifically the deadlock interaction segment engagement flange 127 in a blocking or biased position and not in a free or unbiased position. The transient contact surface 119 is illustrated to be in a different plane to the opposing surfaces 113, 114. The different plane is illustrated to be an orthogonal plane. The transient contact surface 119 is illustrated to be parallel to a surface on which protrusion 118 extends from.

While the intermediate component 111 is illustrated to be L-shaped, from the teaching herein, the skilled person is readily able to select other suitable shapes.

Intermediate component 111 is shown to comprise a channel surface adjacent surface 116 which moves away from channel surface when intermediate component 111 is moved from the blocking position to the free position. As illustrated, protrusion 118 extends from or is part of the channel surface adjacent surface 116.

When in the locked orientation, the deadlock flange 146 does not extend into the channel 104 and when in the unlocked orientation the deadlock flange 146 does extend into the channel 104.

When the intermediate component 111 is in a free or unbiased position, the relative movement may allow the deadlock interaction segment 125 to move relative to the keyless lock interaction segment 130.

As illustrated in FIGS. 1A, 2A and 3A, deadlock interaction segment 125 and the keyless lock interaction segment 130 comprise two separate segments (125,130).

The two separate segments 125, 130 of the linkage 110 may each comprise an engagement flange 127, 131. The engagement flanges 127, 131 may be engaged so that movement of one segment 125, 130 concomitantly moves the other segment 130, 125. The engagement flanges 127, 131 may be engaged so that movement of one segment 125, 130, in one direction, concomitantly moves the other segment 130, 125 in the same direction and concomitant movement in the other direction may be dependent on the position of the intermediate component 111. The deadlock interaction engagement flange 127 and the keyless lock interaction segment engagement flange 131 may be dimensioned so that, independent of the intermediate component 111 position, the two segments 125, 130 move concomitantly in only one direction. The deadlock interaction engagement flange 127 and the keyless lock interaction segment engagement flange 131 may be dimensioned so that, when the intermediate component 111 is in either the free position or the blocking position, movement of the deadlock interaction segment 125 towards the deadlock 140 concomitantly moves the keyless lock interaction segment 130 in the same direction.

The two separate segments 125, 130 of the linkage 110 are illustrated to be dimensioned so that when the intermediate component 111 is in the free position, each segment 125, 130 may move independently of the other.

The deadlock interaction segment 125 is illustrated to comprise an L-shape. The engagement flange 127 may extend from one end of the L-shape such as, the foot of the L-shape, as illustrated. The keyless lock interaction segment 130 is shown to comprise an S-shape. The engagement flange 131 may comprise one end of the S-shape. The intermediate component 111 may be housed between two parallel arms of the S-shape.

Although illustrated to be comprised of component parts, in other embodiments linkage 110 may be an integral or one-piece component.

Deadlock interaction segment 125 is illustrated to be adjacent to deadlock 140 and keyless lock interaction segment 130 is adjacent to keyless lock 180.

Multi-lock 100 is illustrated to comprises a safety override 135 which allows manual movement of linkage 110 and thereby manual movement of the deadlock actuator 142 to unlock deadlock 140 and open closure 200. In the embodiment of FIGS. 1A; 1B; 1C; 2A; 2B; 2C; 3A; 3B; 3C; 4A; 4B; 5; 6; 7A; 7B; 8; 9 and 10, safety override 135 is illustrated to comprise two safety override actuators 120, 136 in the form of intermediate component safety actuator 120 and a linkage safety actuator 136. Linkage safety actuator 136 is illustrated to be comprised on deadlock interaction segment 125.

Figure 7A:
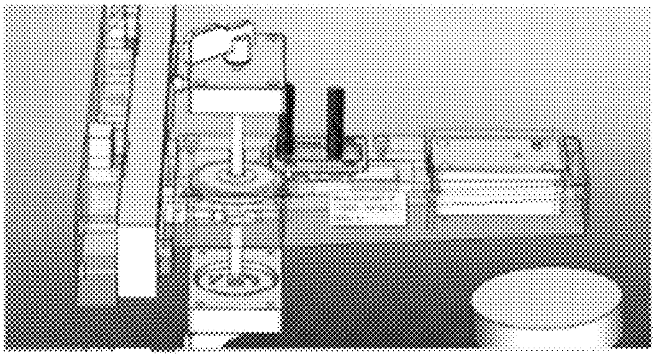
FIG. 7A is a schematic, perspective, partial phantom, partially exploded view of a multi-lock for a closure according to another embodiment of the invention, showing the safe side and allowing visualisation of the safety actuators according to one embodiment of the invention.
Figure 7B:
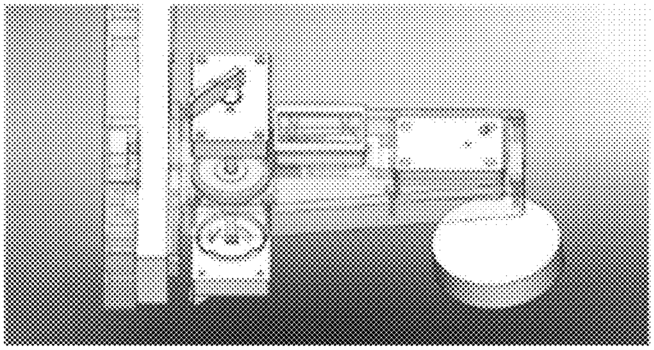
FIG. 7B is a schematic, perspective, partial phantom, partially exploded view of a multi-lock for a closure according to another embodiment of the invention, showing the safe side.
Figure 8:
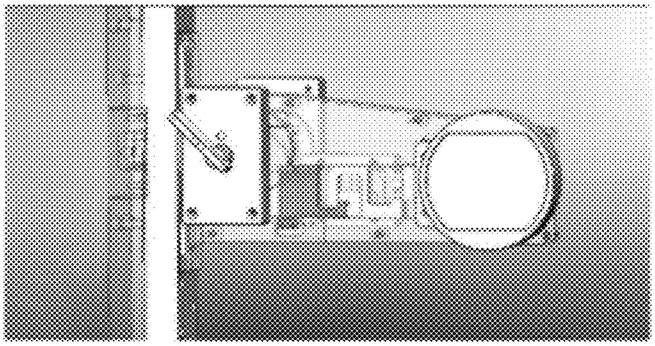
FIG. 8 is a schematic, perspective, partial phantom view of a multi-lock for a closure according to another embodiment of the invention, showing the attack side.
Figure 9:
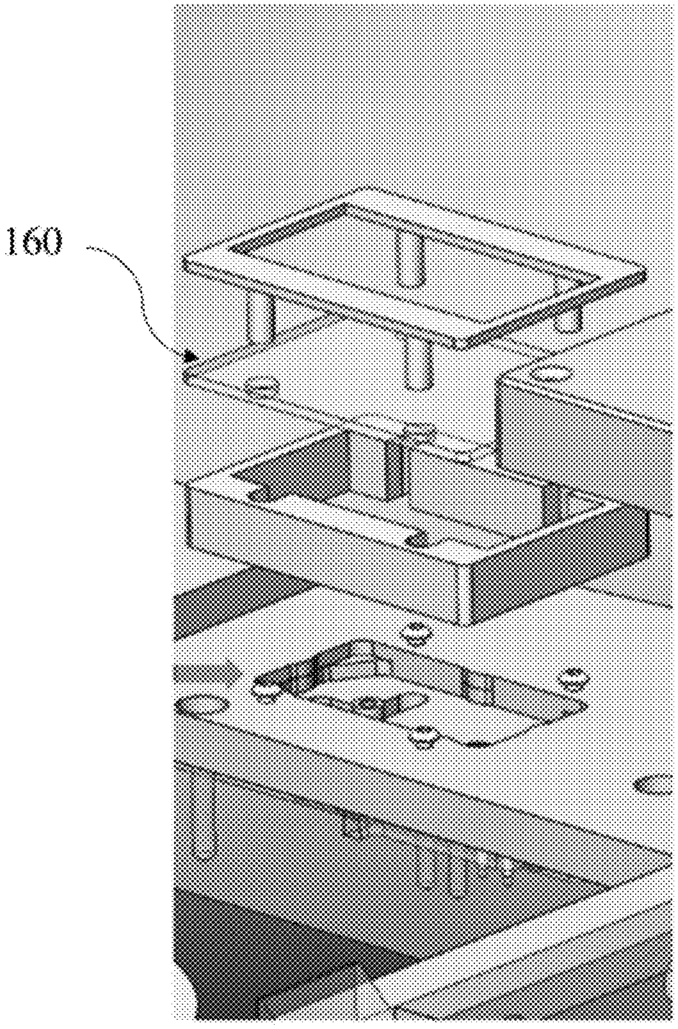
FIG. 9 is a schematic, perspective, partially exploded view of a multi-lock for a closure according to another embodiment of the invention, showing the break glass assembly.

Each of the one or more safety actuators 120, 136 as illustrated in FIG. 7A, to be dimensioned to be gripped by hand, optionally in the form of a pin or rod. Each of the one or more actuators may be removable optionally from a housing 137. One housing 127 may be comprised on deadlock interaction segment 125 and one housing 137 may be comprised on intermediate component 111.

Operation of the intermediate component safety actuator 120 is shown to move the intermediate component 111 against the biasing mechanism 112. Also, the operation of linkage safety actuator 136 moves deadbolt 144 from the locked extended position to the unlocked retracted position.

FIGS. 11 to 14 illustrate another embodiment of multi-lock 100, which comprises a segment biasing mechanism 128 which applies a bias, or force, to the deadlock interaction segment 125 so linkage 110 is in the extended and locked orientation. While segment biasing mechanism 128 is illustrated to be a spring, from the teaching herein, a person of skill in the art is readily able to select other suitable biasing mechanisms.

The keyless locking component comprises sufficient force to overcome the segment biasing mechanism 128 to move linkage 110 when keyless lock 180 is locked. When keyless lock 180 is unlocked, the segment biasing mechanism 128 is operational, in that the bias is applied, to move linkage 110 into the extended and locked orientation.

Figure 14:
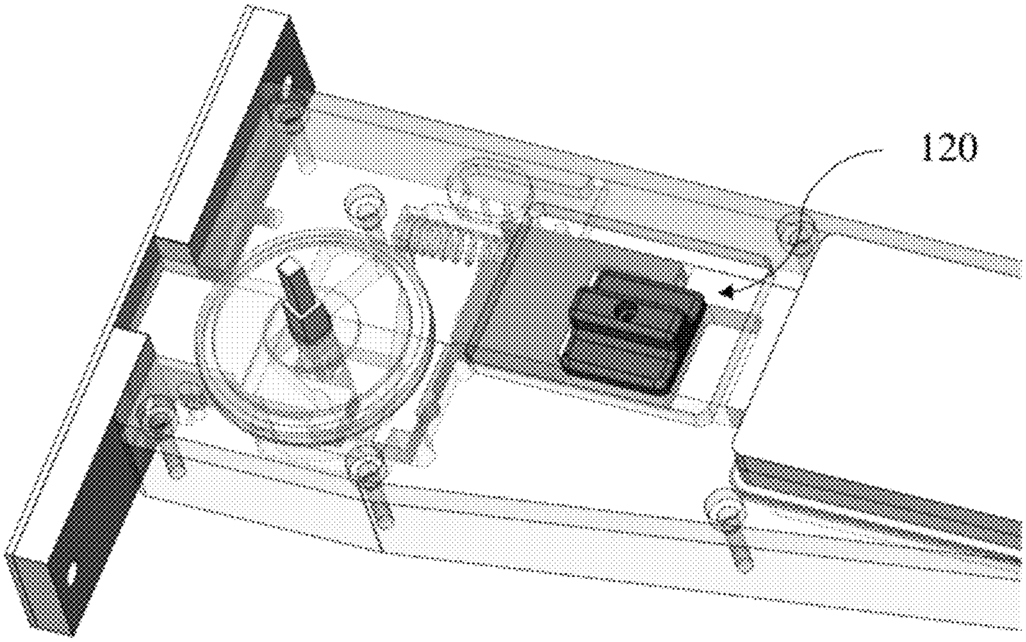
FIG. 14 shows a top perspective, partial phantom view with the cover removed showing another embodiment of a safety actuator according to the invention.

FIG. 14 illustrates that with segment biasing mechanism 128 present, the linkage safety actuator 136 may be omitted and only the intermediate component safety actuator 102 is required.

While rods or pins may be used with the intermediate component safety actuator 120 and linkage safety actuator 136 of the embodiments shown in FIGS. 1A; 1B; 1C; 2A; 2B; 2C; 3A; 3B; 3C; 4A; 4B; 5; 6; 7A; 7B; 8; 9 and 10, in the embodiment of FIGS. 11 to 14, the intermediate component safety actuator 120 is shown in the form of a handle.

Safety override 135 is illustrated to be located on and operable only on a safe side of the closure 200.

Advantageously, the safety override 135 allows opening of the closure 200 independent of the keyless lock 180 and with the deadlock locked 140.

In the embodiment of FIGS. 1A; 1B; 1C; 2A; 2B; 2C; 3A; 3B; 3C; 4A; 4B; 5; 6; 7A; 7B; 8; 9 and 10, safety override 135 is illustrated to be behind a break glass assembly 160, which in the embodiment illustrated is positioned over the one or more safety override actuators 120, 136. The break glass assembly 160 comprises a break glass window 161, optionally comprised of frangible glass. In other embodiments other frangible materials may be used such as, a polymer or other material. Preferably the break glass window 161 is transparent. The break glass window may be disposed distal to the deadbolt actuator. The break glass window may comprise one or more fenestration for fitting underneath a top-plate. The break glass assembly may comprise a packing cassette with a side wall. The sidewall may have a height to create space inside the break glass assembly.

Break glass assembly 160 is illustrated as being disposed on only the safe side of closure 200.

In the embodiment of FIGS. 11 to 14, no such break glass assembly 160 is implemented.

From the teaching herein, the skilled person is readily able to select a suitable keyless lock actuator 182 such as a dial, a keypad or biometric authenticator or authentication input.

The keyless lock 180 may be a permutation lock. Operation of the actuator 182 may unlock the keyless lock 180.

The keyless lock actuator 182 may require unlocking for operation. The unlocking may require entry of a correct combination or biometric authentication or authentication.

The keyless lock actuator 182 is illustrated to be disposed on only the attack side of closure 200.

The keyless lock 180 may be a restricted item, for purposes of security.

As shown in the figures, deadlock 140 comprise a deadbolt 144 which is moved from an extended position in the locked position to a retracted position in the unlocked position. The retracted position is illustrated to be within multi-lock chassis 102. The extended position extends out of a multi-lock chassis 102 to effect the locking of the closure 200.

As shown in FIGS. 1A, 2A and 3A, a microswitch 106 makes contact with linkage 110 when linkage 110 is in the extended and locked orientation but no contact with the linkage 110 in the retracted and unlocked orientation. This extended and locked orientation of linkage 110 requires the keyless lock 180 to be locked and the keyless locking component 184 to be extended. The microswitch 106 contact status may be reported to a monitor. A change in status may trigger an alarm. The alarm may comprise sending of one or more electronic communication.

The multi-lock 110 may comprise a distal lock 190 (not shown), which may be a deadlock or a mortice lock. The distal lock 190 may be connected to the deadlock 140 with a linkage mechanism (not shown). The multi-lock chassis 102 may comprise the distal lock 190.

Figure 10:
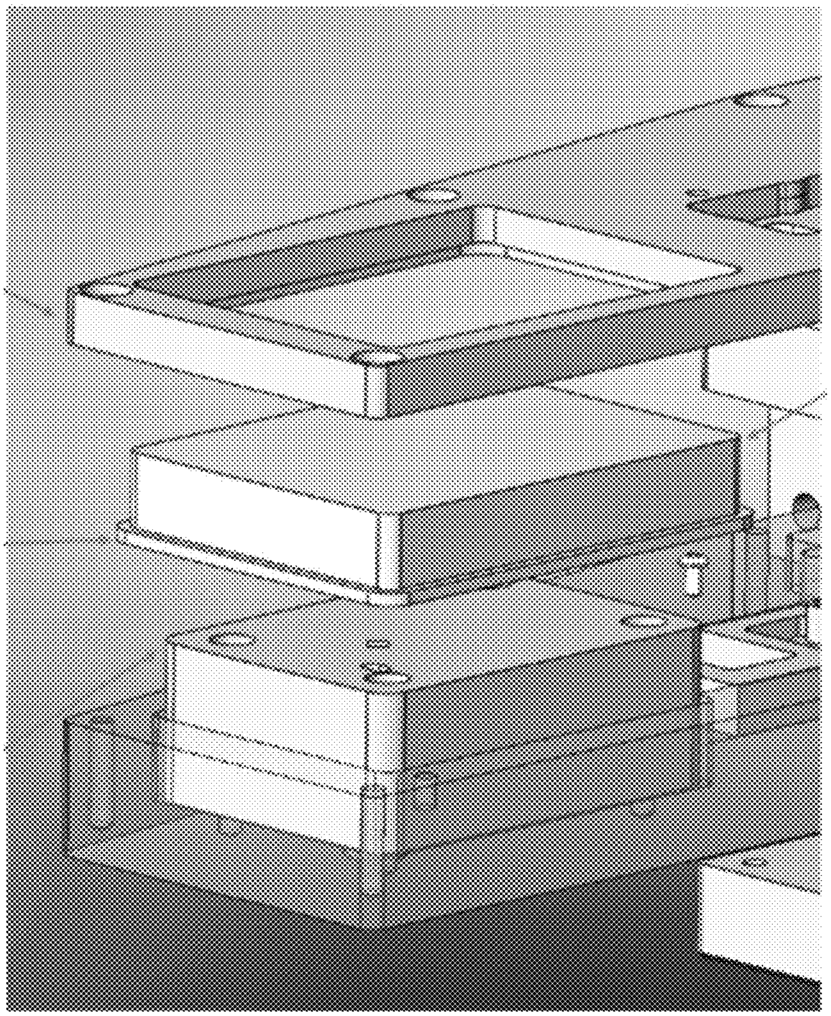
FIG. 10 is a schematic, perspective, partially exploded view of a multi-lock for a closure according to another embodiment of the invention, showing the insertion of keyless lock body into the chassis.
Figure 11:
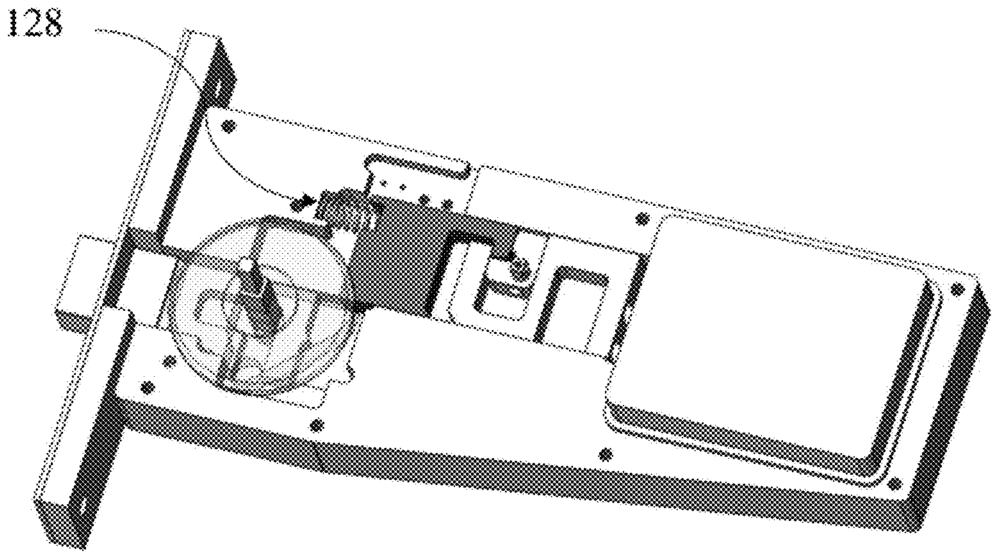
FIG. 11 shows a top perspective, partial phantom view with the cover removed and the keyless lock locked acting against a bias and the dead bolt locked and extended according to one embodiment of the present invention.
Figure 12:
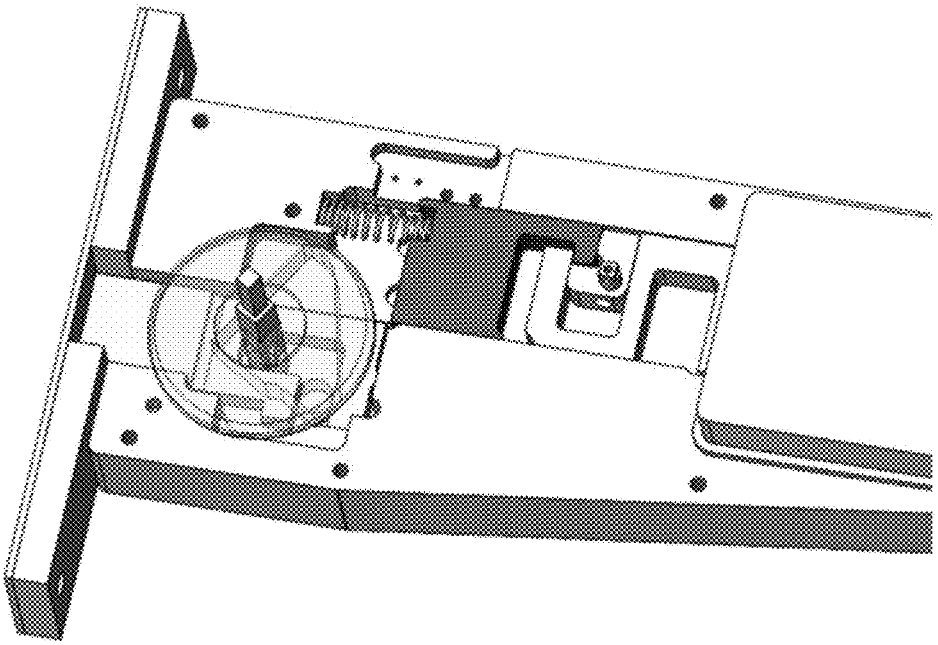
FIG. 12 shows a top perspective, partial phantom view with the cover removed and the keyless lock unlocked, bias operational and the dead bolt unlocked and retracted according to one embodiment of the present invention.
Figure 13:
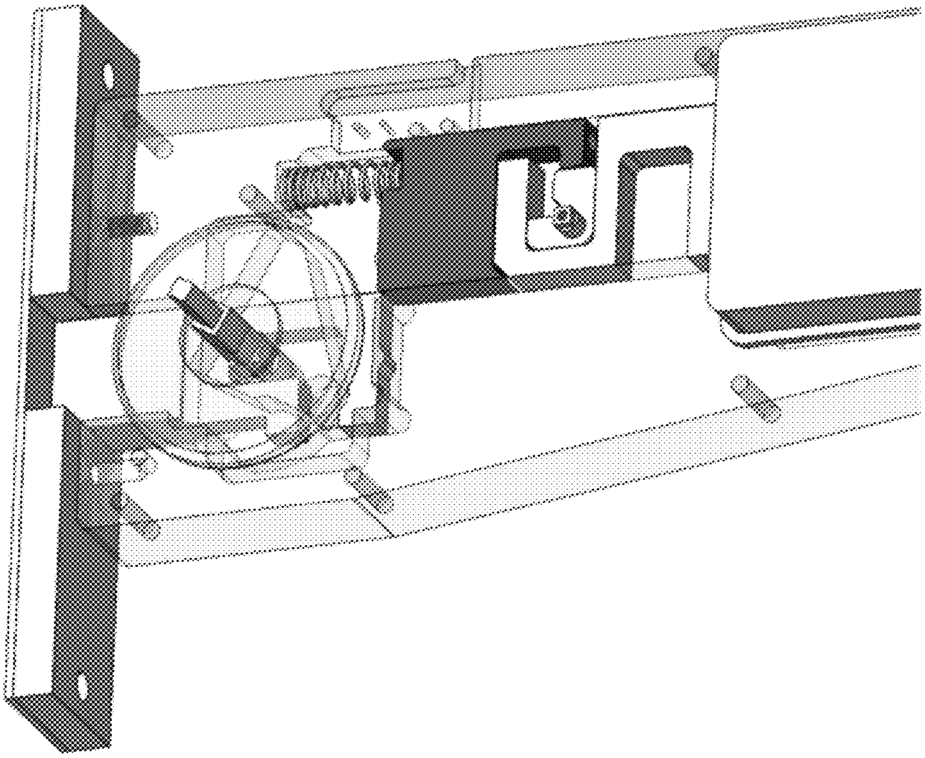
FIG. 13 shows a top perspective, partial phantom view with the cover removed and the keyless lock unlocked, bias operational so the dead bolt is unlocked and retracted and the intermediate component moved against the biasing mechanism.

As shown in FIG. 10 the multi-lock chassis 106 comprises one or more void and/or one or more insertion flange for receiving the keyless lock body 188.

Additionally, the multi-lock chassis 102 may comprise tamper-resistant or tamper-proof fasteners.

Although not shown, either or both of deadlock 140 and keyless lock 180 may comprise a drive mechanism to drive the deadbolt 144 and/or keyless locking component 184. From the teaching herein, the skilled person readily appreciates that the drive mechanisms may comprise any suitable automated drive mechanism such as, various electrically operated drive mechanisms. For example, the drive mechanism may comprise a motor to drive movement. However, other drive mechanisms may be used, such as electronic or electromechanical mechanisms, including a solenoid, a sprung pin activated by a solenoid, or other motor driven cam arrangements. The electronic or electromechanical mechanisms may draw power from a power supply. The drive mechanism may be internally located.

When the drive mechanism is a solenoid, the solenoid may actuate between different orientations or positions.

Either or both of the drive mechanisms may be controlled electronically by an electronic control. The electronic control may comprise one or more of a circuit board or computer such as, a programmable logic controller. The electronic control may be disposed inside or external to the chassis. The drive mechanism may be connected or connectable to a main door or building access controller.

Advantageously, either one or both drive mechanism may be actuated when a particular event is detected such as, when a person activates a safety feature of a building—such as a "break glass" switch.

The drive mechanism may operate in a vertical or a horizontal direction.

The invention also provides a method of manufacturing a multi-lock 100 for a closure and a method of installing a multi-lock 100 for a closure. The installation method may be a new installation or a retro-installation into an existing closure.

Except where otherwise specified, the components of the multi-lock 100 may all be formed from steel, although different materials may be used for different applications. The components may be formed as castings or mouldings, extrusions, and/or may be machined to take their final shape for installation.

In this specification, the terms "comprises", "comprising" or similar terms are intended to mean a non-exclusive inclusion, such that an apparatus that comprises a list of elements does not include those elements solely, but may well include other elements not listed.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. A multi-lock for a closure comprising:

a deadlock comprising a deadlock actuator operation of which moves a deadbolt between an unlocked retracted position and a locked extended position;

a keyless lock comprising a keyless lock actuator wherein operation of the keyless lock moves a keyless locking component between a locked position and an unlocked position; and a linkage comprising a deadlock interaction segment in operative connection with the deadlock and a keyless lock interaction segment in operative connection with the keyless lock and an intermediate component, the intermediate component being movable between a blocking position and a free position such that:

when in the blocking position, movement of the deadbolt from the locked position to the unlocked position is blocked;

when in the free position, the intermediate component allows relative movement of the deadlock interaction segment and the keyless lock interaction segment to thereby allow the deadbolt to be moved to its unlocked position.

2. A closure comprising a multi-lock for a closure according to claim 1.

3. The multi-lock according to claim 1 wherein the keyless locking component is in an extended position in the locked position and a retracted position in the unlocked position.

4. The multi-lock according to claim 3 wherein the keyless locking component is operatively connected to the linkage.

5. The multi-lock according to claim 4 wherein the operative connection is such that movement of the keyless locking component directly results in corresponding movement of the linkage.

6. The multi-lock according to claim 1 wherein the linkage has an extended and locked orientation in which the keyless lock is locked and a retracted and unlocked orientation in which the keyless lock is unlocked.

7. The multi-lock according to claim 1 wherein the deadlock comprises the deadlock flange disposed to move with operation of a deadlock actuator.

8. The multi-lock according to claim 7 wherein the deadlock actuator concomitantly moves the deadlock flange.

9. The multi-lock according to claim 8 wherein the deadlock flange is dimensioned so that its movement from the locked orientation to the unlocked orientation is prevented when the linkage is in the extended and locked orientation.

10. The multi-lock according to claim 8 wherein the deadlock flange is dimensioned so that its movement is not restricted when the linkage is in the retracted and unlocked orientation.

11. The multi-lock according to claim 1 wherein the intermediate component is positioned between the keyless lock interaction segment and the deadlock interaction segment.

12. The multi-lock according to claim 1 wherein the intermediate component comprises a protrusion.

13. The multi-lock according to claim 1 wherein the intermediate component comprises a transient contact surface.

14. The multi-lock according to claim 1 wherein when the intermediate component is in a free or unbiased position, the relative movement allows the deadlock interaction segment to move relative to the keyless lock interaction segment.

15. The multi-lock according to claim 1 wherein the multi-lock comprises a safety override.

16. The multi-lock according to claim 15 wherein the safety override comprises one or more safety actuator dimensioned to be gripped by hand to allow manual movement of the linkage and thereby manual movement of the deadlock actuator to unlock the deadlock and open the closure.

17. The multi-lock according to claim 1 further comprising a microswitch.

18. A method of manufacturing a multi-lock for a closure comprising:

providing a deadlock comprising a deadlock actuator operation of which moves a deadbolt between an unlocked retracted position and a locked extended position;

providing a keyless lock comprising a keyless lock actuator wherein operation of the keyless lock moves a keyless locking component between a locked position and an unlocked position; and providing a linkage comprising a deadlock interaction segment in operative connection with the deadlock and a keyless lock interaction segment in operative connection with the keyless lock and an intermediate component, the intermediate component being movable between a blocking position and a free position such that:

when in the blocking position, movement of the deadbolt from the locked position to the unlocked position is blocked;

when in the free position, the intermediate component allows relative movement of the deadlock interaction segment and the keyless lock interaction segment to thereby allow the deadbolt to be moved to its unlocked position.

19. A method of installing a multi-lock for a closure comprising:

installing a deadlock comprising a deadlock actuator operation of which moves a deadbolt between an unlocked retracted position and a locked extended position;

installing a keyless lock comprising a keyless lock actuator wherein operation of the keyless lock moves a keyless locking component between a locked position and an unlocked position; and installing a linkage comprising a deadlock interaction segment in operative connection with the deadlock and a keyless lock interaction segment in operative connection with the keyless lock and an intermediate component, the intermediate component being movable between a blocking position and a free position such that:

when in the blocking position, movement of the deadbolt from the locked position to the unlocked position is blocked;

when in the free position, the intermediate component allows relative movement of the deadlock interaction segment and the keyless lock interaction segment to thereby allow the deadbolt to be moved to its unlocked position.

20. The method according to claim 19 wherein the installation is a new installation or a retro-installation into an existing closure.

* * * * *